United States Patent
Udagawa

Patent Number: 5,150,910
Date of Patent: Sep. 29, 1992

[54] GASKET WITH SOFT AND HARD SEAL COATINGS

[75] Inventor: Tsunekazu Udagawa, Ichikawa, Japan

[73] Assignee: Ishikawa Gasket Co., Ltd., Tokyo, Japan

[21] Appl. No.: 546,930

[22] Filed: Jul. 2, 1990

[51] Int. Cl.⁵ ............................................. F16J 15/06
[52] U.S. Cl. ............................. 277/235 B; 277/235 A
[58] Field of Search ............... 277/235 B, 180, 235 A, 277/235 R, 233, 227

[56] References Cited

U.S. PATENT DOCUMENTS

| | | | |
|---|---|---|---|
| 3,794,333 | 2/1974 | Czernik et al. | 277/235 B X |
| 4,088,621 | 5/1978 | Miller | 524/443 |
| 4,169,185 | 9/1979 | Bhatia | 428/447 X |
| 4,220,342 | 9/1980 | Shah | 277/235 A X |
| 4,223,897 | 9/1980 | Staab et al. | 277/235 B |
| 4,317,576 | 3/1982 | Barker et al. | 277/235 B |
| 4,428,593 | 1/1984 | Pearlstein | 277/235 B |
| 4,519,619 | 5/1985 | Doyle | 277/235 B |
| 4,743,421 | 5/1988 | McDowell et al. | 277/235 B |
| 4,745,030 | 5/1988 | Arahara et al. | 428/421 |
| 4,754,982 | 7/1988 | Udagawa et al. | 277/235 B |
| 4,778,189 | 10/1988 | Udagawa | 277/215 X |
| 4,799,695 | 1/1989 | Yoshino | 277/235 B X |
| 4,826,708 | 5/1989 | Udagawa | 277/235 B X |
| 4,828,275 | 5/1989 | Udagawa | 277/235 B X |
| 4,830,698 | 5/1989 | Decore et al. | 277/235 B |
| 4,929,691 | 5/1990 | Fillmore et al. | 528/23 X |
| 4,929,703 | 5/1990 | Narula et al. | 528/23 |
| 4,972,005 | 11/1990 | Aoki et al. | 528/32 X |
| 5,004,650 | 4/1991 | Ashizawa et al. | 277/235 B X |

FOREIGN PATENT DOCUMENTS

| | | | |
|---|---|---|---|
| 10954 | 5/1980 | European Pat. Off. | |
| 922452 | 1/1955 | Fed. Rep. of Germany | 277/235 B |
| 179469 | 11/1982 | Japan | 277/235 B |
| 1212839 | 11/1970 | United Kingdom | 277/235 B |
| 2218755 | 11/1989 | United Kingdom | |

*Primary Examiner*—Allan N. Shoap
*Assistant Examiner*—Scott W. Cummings
*Attorney, Agent, or Firm*—Kanesaka and Takeuchi

[57] ABSTRACT

A gasket of the present invention is formed of at least one main plate having at least one opening to be sealed. At least one hard coating is formed around the opening of the main plate to have a predetermined lateral width. On an surface of the main plate with the hard coating, a soft coating is formed. The hard coating provides surface pressure when the gasket is tightened, and the soft coating tightly seals around the opening.

8 Claims, 1 Drawing Sheet

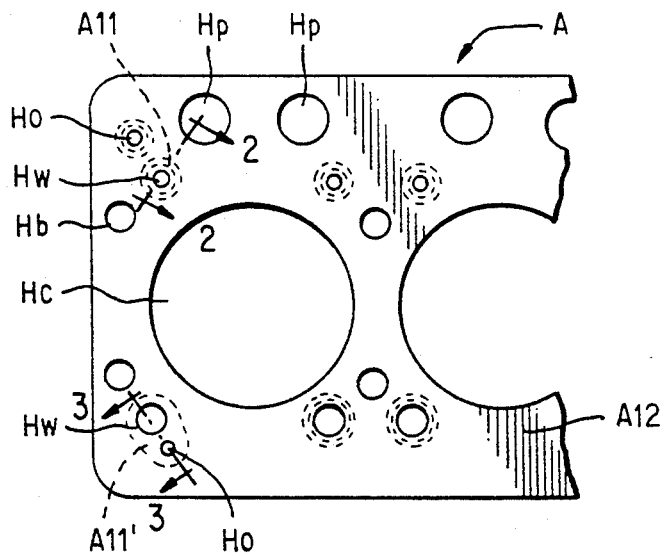
FIG. 1
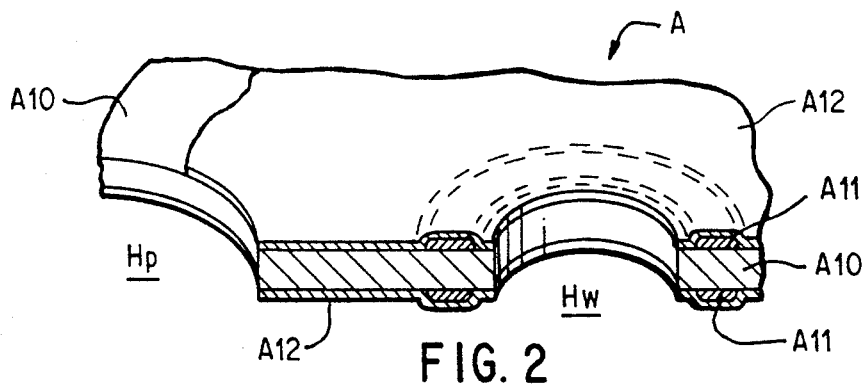
FIG. 2
FIG. 3
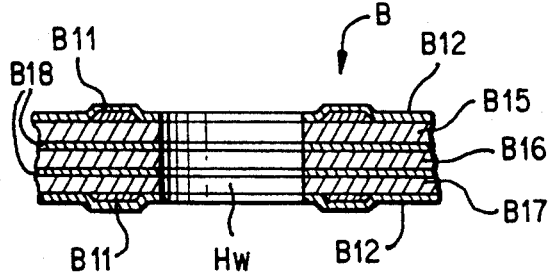
FIG. 4
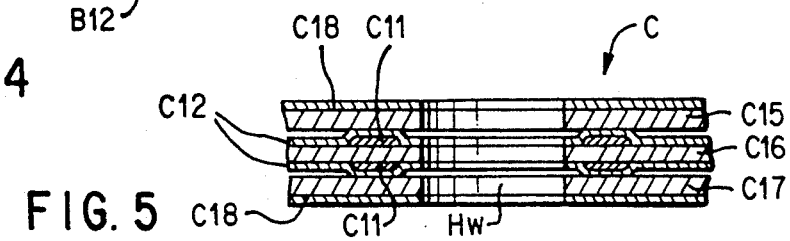
FIG. 5

GASKET WITH SOFT AND HARD SEAL COATINGS

BACKGROUND OF THE INVENTION AND RELATED ART STATEMENT

The present invention relates to a gasket having soft and hard coatings thereon to effectively seal around a fluid hole of an engine.

In order to seal around a fluid hole, a gasket is installed between two parts. In an automobile, all the parts are subjected to heat and vibration, so that sealing at a joint portion of two parts of the automobile is liable to be damaged to cause leakage of fluid. Therefore, there has been proposed many methods to solve this problem.

One of conventional methods is that a resilient layer or soft coating with a predetermined lateral length is formed on a plate around a hole to be sealed. Since the one resilient layer is formed on the plate, when heavy pressure is repeatedly applied thereto, the resilient layer may break.

In order to improve the above drawbacks, U.S. Pat. Nos. 4,778,189 and 4,828,275 have been proposed, wherein a plurality of elastic members is formed around a hole to be sealed to spread compression force applied thereto. However, if tightening pressure is strong, the elastic members may still break or flow.

On the other hand, when a cylinder head is formed, a plurality of small scratches or grooves is formed on the surface of the cylinder head due to cutter traces. In order to fill in the small scratches, it is a conventional practice to form a soft coating on a surface of a gasket abutting against a cylinder head.

The soft coating is not so strong against high heat and pressure. Namely, if high heat and pressure is applied to the soft coating, the soft coating looses its elasticity and may creep or flow. Therefore, the soft coating can not be applied thick in a gasket, because surface pressure on the gasket gradually decreases due to creep or flow of the soft coating.

On the other hand, a hard coating does not deform so much against high heat and pressure, i.e. low permanent distortion against heat and compression. Therefore, a hard coating may be applied onto an entire surface of a gasket in case the surface of the gasket is not mechanically strong, such as a compressible material made of rubber and organic or inorganic fibers.

However, since the hard coating can not fill in small scratches on the surface of the cylinder head nor is suitable for sealing, the soft coating may be applied onto the outer surface of the hard coating if required. Also, in case the soft coating does not adhere to a gasket, the hard coating may be applied onto the gasket to operate as a primer.

Accordingly, one object of the present invention is to provide a gasket which can effectively seal around a fluid hole by utilizing hard and soft coatings.

Another object of the invention is to provide a gasket as stated above, wherein a sealing mechanism around a fluid hole can be easily and economically formed on a gasket.

Further objects and advantages of the invention will be apparent from the following description of the invention.

SUMMARY OF THE INVENTION

In accordance with the present invention, the gasket is formed of at least one main plate having at least one opening to be sealed therearound. At least one hard coating is applied around the opening on an upper surface and/or lower surface of the main plate. The hard coating has low permanent distortion against compression, so that when the gasket is tightened, the hard coating can provide high surface pressure around the opening without large distortion or deformation.

At least one soft coating softer than the hard coating is applied over an outer surface of the substantial area of the main plate including the hard coating. Since the soft coating is excellent in fitness or contact ability relative to other material, the soft coating enhances sealing ability around the opening.

Further, when the soft coating contacts small scratches or grooves, the soft coating can fill in the small scratches. Therefore, when the gasket with the soft coating is installed to contact a cylinder head, it is possible to smooth the contact surface between the cylinder head and the gasket. As a result, the cylinder head can slide relative to the gasket to absorb strain therebetween when operated.

In the present invention, the hard coating is formed on the main plate around the opening, and the soft coating is coated on the main plate over the hard coating. Therefore, when the gasket is tightened, high sealing pressure is obtained around the opening to seal therearound. The soft coating enhances the sealing ability around the opening.

In the present invention, the soft coating is not formed thick, so that flow or creep relaxation of the soft coating does not substantially occur. Namely, large decrease of surface pressure of the gasket due to heat and compression is substantially prevented.

Preferable, hardness of the hard coating is over H in pencil hardness, i.e. H-8H, and the thickness of the hard coating is between 2-100 micra. Also, hardness of the soft coating is under F in pencil hardness, i.e. F-8B, and the thickness of the soft coating is between 5-100 micra, preferably 5-30 micra.

The hard and soft coatings may be formed on one side of the main plate. Alternatively, the hard and soft coatings may be formed on both sides of the main plate to constitute a gasket with one plate. Two other plates may be further attached on both sides of the main plate to constitute a laminate gasket.

When the hard and soft coatings are formed on one side of the main plate, another plate with the hard and soft coatings may be prepared and piled together so that the coatings orient outwardly. Thus, a laminate gasket is formed.

The main plate may be formed of any kind of gasket material, such as combination of rubber and organic or inorganic fibers, or metal plate.

BRIEF DESCRIPTION OF THE DRAWINGS

FIG. 1 is a plan view of a part of a first embodiment of a gasket of the present invention;

FIG. 2 is an enlarged perspective section view taken along line 2—2 in FIG. 1;

FIG. 3 is an enlarged section view taken along line 3—3 in FIG. 1;

FIGS. 4 and 5 are enlarged section views, similar to FIG. 3, for showing second and third embodiments of the invention.

DETAILED DESCRIPTION OF PREFERRED EMBODIMENTS

Referring to FIGS. 1-3, a first embodiment A of a gasket of the present invention is shown. The gasket A is a cylinder head gasket and is provided with a plurality of cylinder holes Hc, water holes Hw, oil holes Ho, bolt holes Hb and push rod holes Hp. Areas around the water holes Hw and oil holes Ho are sealed in accordance with the present invention. However, if required, the bolt holes Hb and push rod holes Hp may be sealed as in the present invention.

In regard to the cylinder holes Hc, since high temperature and high pressure are applied, it is preferable to seal around the cylinder holes Hc by other sealing mechanisms. However, in case high temperature and high pressure are not applied to the gasket, it is possible to seal around the cylinder hole Hc in accordance with the present invention. The present invention may be used as a secondary seal around the cylinder hole Hc.

As shown in FIGS. 2 and 3, the gasket A comprises a plate A10 extending the entire area of the gasket. The plate A10 is formed of a gasket material, such as a combination of rubber and organic or inorganic fibers. The plate A10 may be a ductile metal or steel plate.

As shown in FIG. 2, hard coatings A11 are formed on upper and lower surfaces of the plate A10 to surround the water hole Hw. The hard coating A11 has low permanent distortion against compression, and shows low creep relaxation. Namely, the hard coating A11 are not substantially crushed when the gasket A is compressed at high temperature. As a result, when the gasket A is actually used, the hard coating A11 can provide surface pressure around the water hole Hw without creep relaxation.

The hard coating A11 is formed around the water hole Hw by screen printing. The hard coating A11 may be formed of epoxy resin, silicone resin, fluorine resin and so on. Hardness of the hard coating A11 is harder than H in pencil hardness, i.e. H-8H. The thickness of the hard coating is 2-100 micra.

Soft coatings A12 are formed over the entire upper and lower surfaces of the plate A10 and the hard coatings A11. The soft coating A12 is excellent in resiliency and sealing ability. Further, the soft coating A12 can fill in small scratches or grooves formed on the cylinder head due to cutter tracings. Namely, the surface of the cylinder head abutting against the gasket is smoothed by the soft coating A12, so that the cylinder head can smoothly slide or expand over the gasket when heated.

The soft coatings A12 are formed over the plate A10 and the hard coatings A11 by screen printing. The soft coating A12 may be NBR gum, fluorine gum, silicone gum and so on. The hardness of the soft coating is softer than F in pencil hardness, i.e. F-8B. The thickness of the soft coatings A12 is 5-100 micra, preferably 5-30 micra.

In case the water hole Hw and oil hole Ho are arranged adjacent to each other, the hard coatings need not be separately formed. As shown in FIGS. 1 and 3, the hard coatings A11' may be combined together to surround the two holes.

In the gasket A, the hard coatings A11, A11' are formed around the water holes Hw and oil holes Ho, and the soft coatings A12 are formed over the hard coatings and the rest of the plate A10. Therefore, when the gasket A is tightened, the hard coatings A11, A11' provide high surface pressure around the water holes Hw and oil holes Ho to securely seal therearound. The soft coatings A12 fill in small scratches or grooves on the cylinder head (not shown) and improve sealing ability. Therefore, the gasket can securely seal around the water holes Hw and oil holes Ho.

Since the hard coatings A11, A11' and soft coatings A12 are formed by screen printing, it is easy to form the hard and soft coatings on the plate A10. Further, the surface pressure can be easily changed by changing the thickness of the hard coatings.

Further, since the hard coatings A11, A11' are formed to provide surface pressure around the holes, it is possible to use the minimum amount or thickness of the soft coating. As a result, creep relaxation of the soft coating can be minimized.

FIG. 4 shows a second embodiment B of a gasket of the present invention. The gasket B is a steel laminate gasket and is formed of upper, middle and lower plates B15, B16, B17. The upper plate B15 is provided with a hard coating B11 around the water hole Hw, and a soft coating B12 above the entire area of the upper plate B15. The hard and soft coatings B11, B12 are the same as the hard and soft coatings A11, A12.

The middle plate B16 is situated under the upper plate B15, and is provided with soft coatings B18 on both surfaces thereof. The soft coating B18 is the same as the soft coating B12 and prevents fluid from entering between the plates.

The lower plate B17 is provided with the hard coating B11 around the water hole Hw, and the soft coating B12 as in the upper plates, which are formed on a lower surface of the lower plate B17.

When the gasket B is situated between the cylinder head and cylinder block (both not shown) and is tightened, the hard coatings B11 are not crashed and provide surface pressure around the water hole Hw. The soft coatings B12, B18 securely seal around the water hole Hw. The gasket B operates substantially the same as the gasket A.

FIG. 5 shows a third embodiment C of a gasket of the present invention. The gasket C is a steel laminate gasket and comprises upper, middle and lower plates C15, C16, C17. The upper and lower plates C15, C17 includes soft coatings C18 on outer surfaces thereof.

The middle plate C16 is similar to the gasket A, and is provided with hard coatings C11 around the water hole Hw, and soft coatings C12. The hard coatings C11 and soft coatings C12, C18 are the same as the hard coatings A11 and soft coating A12 in the gasket A.

In the gasket C, since the hard coatings C11 are formed on the middle plate C16, when the gasket C is tightened, strong sealing pressure is especially formed between the plates. In the gasket C, sealing between the plates is especially excellent. The gasket C operates as in the gasket B.

In the present invention, areas around the fluid holes can be easily and securely sealed. Further, there is no significant decrease of surface pressure around the fluid hole in long usage.

While the invention has been explained with reference to the specific embodiments of the invention, the explanation is illustrative and the invention is limited only by the appended claims.

What is claimed is:

1. A gasket for sealing between two engine parts, comprising,
    at least one main plate having at least one opening to be sealed therearound, and upper and lower surfaces, hard coating formed on at least one of the upper and lower surfaces of the main plate and disposed around the opening with predetermined lateral width, said hard coating having hardness between H and 8H in pencil hardness and thickness between 2 and 100 micra so that aid hard coating provides high surface pressure around the opening when the gasket is tightened, and soft coating formed on at least one of the upper and lower surfaces of the main plate with the hard coating for covering a substantial area of the main plate, said soft coating having hardness between F and 8B in pencil hardness and thickness between 5 and 100 micra to provide sealing ability on the gasket so that when the gasket is tightened, the hard coating provides surface pressure around the opening and the soft coating supported by the hard coating closely seals around the opening.

2. A gasket according to claim 1, wherein said main plate further includes a second opening adjacent to the at least one opening, said hard coating covering said both openings to surround the same.

3. A gasket according to claim 1, wherein said hard and soft coatings are formed on the upper and lower surfaces of the main plate.

4. A gasket according to claim 1, further comprising a second main plate having a second opening, at least one second hard coating formed around the second opening, and at least one second soft coating covering the second hard coating and a substantial area of the second main plate, said second hard coating and second soft coating being substantially the same as those of the hard coating and soft coating on the main plate, said main plate and second main plate being piled and arranged symmetrically so that the coatings orient outwardly.

5. A gasket according to claim 4, further comprising a middle plate situated between the main plate and the second main plate, and soft coatings interposed between the plates to seal therebetween.

6. A gasket according to claim 1, wherein said hard and soft coatings are formed on the upper and lower surfaces of the main plate, said gasket further including upper and lower plates situated above and below the main plate respectively to constitute a steel laminate gasket, said hard and soft coatings, when the gasket is tightened, being compressed to securely seal between the plates.

7. A gasket according to claim 1, wherein said hard coating is made of resin, and the soft coating is made of rubber.

8. A gasket according to claim 1, wherein said opening to be sealed by the hard and soft coatings is a fluid hole.

* * * * *